(12) United States Patent
Ikeda et al.

(10) Patent No.: US 10,493,868 B2
(45) Date of Patent: Dec. 3, 2019

(54) AUTOMOBILE SEAT

(71) Applicant: DELTA KOGYO CO., LTD., Hiroshima (JP)

(72) Inventors: Yuji Ikeda, Hiroshima (JP); Takeshi Momose, Hiroshima (JP)

(73) Assignee: DELTA KOGYO CO., LTD. (JP)

(*) Notice: Subject to any disclaimer, the term of this patent is extended or adjusted under 35 U.S.C. 154(b) by 0 days.

(21) Appl. No.: 15/781,710

(22) PCT Filed: Dec. 5, 2016

(86) PCT No.: PCT/JP2016/086056
§ 371 (c)(1),
(2) Date: Jun. 6, 2018

(87) PCT Pub. No.: WO2017/110438
PCT Pub. Date: Jun. 29, 2017

(65) Prior Publication Data
US 2018/0361882 A1 Dec. 20, 2018

(30) Foreign Application Priority Data
Dec. 24, 2015 (JP) ................. 2015-251552

(51) Int. Cl.
*B60N 2/12* (2006.01)
*B60N 2/005* (2006.01)
(Continued)

(52) U.S. Cl.
CPC ............... *B60N 2/12* (2013.01); *B60N 2/005* (2013.01); *B60N 2/28* (2013.01); *B60N 2/309* (2013.01)

(58) Field of Classification Search
CPC . B60N 2/12; B60N 2/005; B60N 2/28; B60N 2/309
(Continued)

(56) References Cited

U.S. PATENT DOCUMENTS

| 4,787,594 A | 11/1988 | Ikegaya et al. |
| 5,664,838 A * | 9/1997 | Baloche .................. B60N 2/12 297/340 |

(Continued)

FOREIGN PATENT DOCUMENTS

| DE | 102007017260 A1 | 12/2007 |
| DE | 102008063617 A1 | 7/2009 |

(Continued)

OTHER PUBLICATIONS

European Search Report dated Nov. 20, 2018.
International Search Report dated Jan. 24, 2017.

*Primary Examiner* — Syed A Islam
(74) *Attorney, Agent, or Firm* — Gerald E. Hespos; Michael J. Porco; Matthew T. Hespos

(57) ABSTRACT

An automobile seat includes a seat main body having a seat cushion frame; a seat supporting member; a link mechanism which allows the seat main body to shift between a first seat position and a second seat position corresponding to a forward-leaning posture; and a seat lock mechanism capable of being switched between a seat-locked state in which the seat main body is restrained at the first seat position and a lock-released state. The seat cushion frame is supported in a manner that a position thereof backward of the front link is suspended by the seat supporting member via the rear link. At the first seat position, a free-end supporting point of the rear link is positioned backward of a first vertical line passing a fixed-end supporting point of the rear link, and at the second seat position, the free-end supporting point is positioned forward the first vertical line.

7 Claims, 14 Drawing Sheets

(51) Int. Cl.
*B60N 2/28* (2006.01)
*B60N 2/30* (2006.01)

(58) Field of Classification Search
USPC .......................... 297/325, 340, 341
See application file for complete search history.

(56) References Cited

U.S. PATENT DOCUMENTS

| | | | | |
|---|---|---|---|---|
| 6,000,742 | A * | 12/1999 | Schaefer | B60N 2/3011 |
| | | | | 296/65.09 |
| 6,152,533 | A * | 11/2000 | Smuk | B60N 2/12 |
| | | | | 297/341 |
| 7,152,923 | B2 * | 12/2006 | Charras | B60N 2/206 |
| | | | | 297/378.12 |
| 7,252,337 | B2 * | 8/2007 | Hofmann | B60N 2/20 |
| | | | | 297/331 |
| 7,300,109 | B2 * | 11/2007 | Hofmann | B60N 2/20 |
| | | | | 297/353 |
| 7,374,244 | B2 * | 5/2008 | Becker | B60N 2/20 |
| | | | | 297/341 |
| 8,038,217 | B2 * | 10/2011 | Yamagishi | B60N 2/06 |
| | | | | 297/341 |
| 8,047,610 | B2 * | 11/2011 | Yamagishi | B60N 2/12 |
| | | | | 297/322 |
| 8,801,101 | B2 * | 8/2014 | Dagcioglu | B60N 2/3011 |
| | | | | 296/65.09 |
| 9,108,544 | B2 * | 8/2015 | Ogata | B60N 2/3013 |
| 9,403,453 | B2 * | 8/2016 | Perrin | B60N 2/90 |
| 9,656,578 | B2 * | 5/2017 | Mitsuhashi | B60N 2/305 |
| 9,663,005 | B2 * | 5/2017 | Kimura | B60N 2/12 |
| 9,987,953 | B2 * | 6/2018 | Kimura | B60N 2/12 |
| 2001/0030456 | A1 * | 10/2001 | Biletskiy | B60N 2/206 |
| | | | | 297/378.12 |
| 2007/0296258 | A1 | 12/2007 | Calvert et al. | |
| 2009/0167068 | A1 | 7/2009 | Yamagishi | |

FOREIGN PATENT DOCUMENTS

| | | |
|---|---|---|
| FR | 2958229 A1 | 10/2011 |
| JP | 62-275853 | 11/1987 |
| JP | 2005-324684 | 11/2005 |
| JP | 2013-154772 | 8/2013 |
| WO | 2008/012364 | 1/2008 |

* cited by examiner

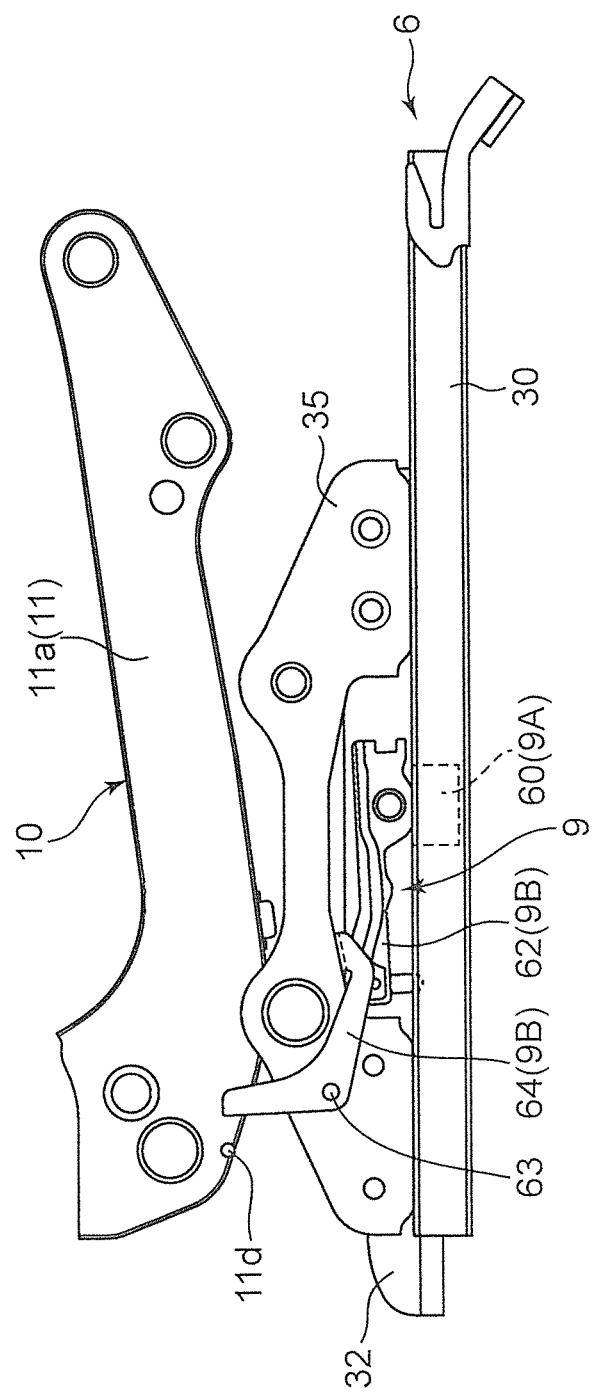

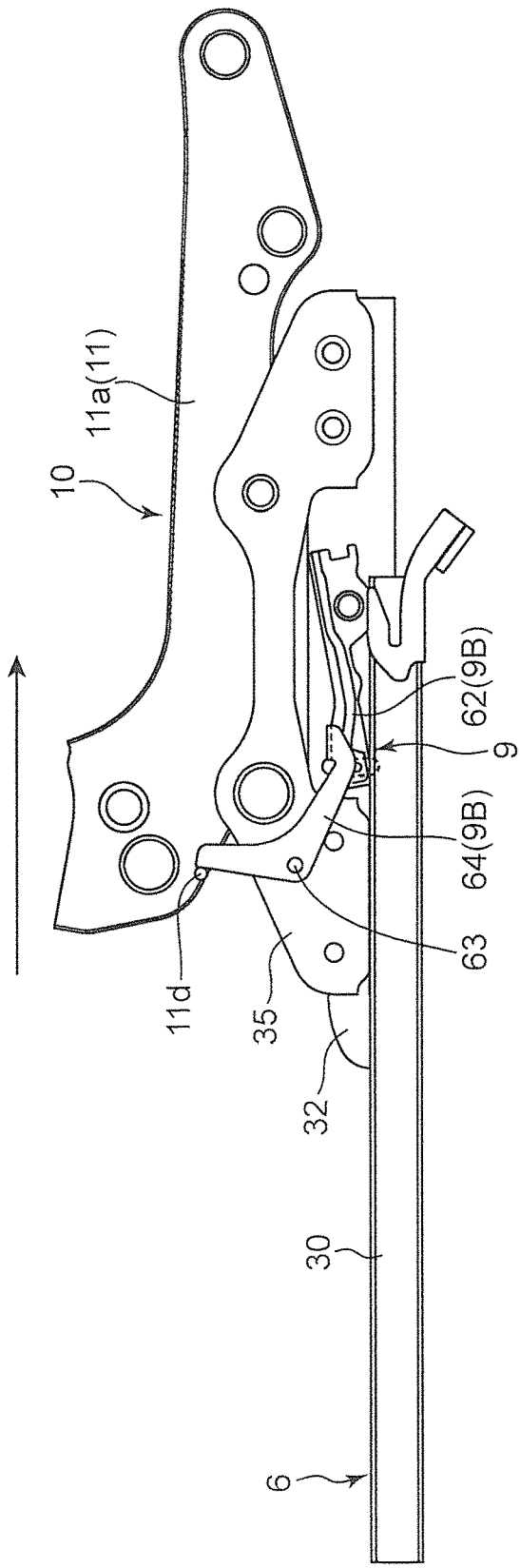

AUTOMOBILE SEAT

TECHNICAL FIELD

The present invention relates to an automobile seat having a walk-in function.

BACKGROUND ART

To a conventional automobile including a second seat or a third seat, an automobile seat (hereinafter, abbreviated as a seat) having a walk-in function in a front seat is applied in order to improve easiness in getting on and off from a rear seat. The walk-in function enables a seat back to lean forward and enables further forward movement of a seat simply by lever operation, thereby allowing a large space for getting on and off between a front seat and a rear seat to be ensured quickly.

However, there is a problem that a child seat mounted on the above seat prevents a seat back from leaning forward to accordingly impair a merit of a walk-in function. Therefore, there is proposed in recent years a seat that can be leaned forward in its entirety as disclosed in WO 2008/012364 A1. Even with a child seat mounted, the seat leans forward in its entirety together with the child seat to make it easy to ensure a space for getting on and off.

To be more precisely described, the seat disclosed in WO 2008/012364 A1 has a seat main body and a slide mechanism, and has a structure in which with the slide mechanism side as a fixed-end supporting point, the seat main body and the slide mechanism are connected by two front and rear links having different lengths, thereby supporting the seat main body from below. Then, when the seat main body is pushed forward from a normal posture in which a passenger is seated, the seat main body moves forward to assume a forward-leaning posture.

The conventional seat recited in WO 2008/012364 A1 has an advantage that even with a child seat mounted, forward leaning of a seat main body in its entirety makes it easier to ensure a space for getting on and off as described above. However, in order to bring the seat main body into the forward-leaning posture, the seat main body needs to be shifted from a normal posture in a gentle arc manner. In other words, operation is required for pushing up the seat main body forward and upward. Restoring the seat main body similarly requires operation of pushing up the seat main body backward and upward. This requires some amount of force and is not always excellent in operability.

SUMMARY OF INVENTION

An object of the present invention, in view of the above circumstances, is to provide an automobile seat having a walk-in function which has high operability while satisfactorily ensuring a space for getting on and off.

The present invention relates to an automobile seat to be installed on a floor panel of a vehicle, the automobile seat including a seat main body having a seat cushion frame; a seat supporting member attached to the floor panel; a link mechanism which includes a front link and a rear link rotatably pivoted by the seat cushion frame and the seat supporting member to connect the seat cushion frame and the seat supporting member at positions different from each other in a front-back direction, and allows the seat main body to shift between a first seat position corresponding to a posture assumed by a passenger when seated and a second seat position forward of the first seat position and corresponding to a forward-leaning posture; and a seat lock mechanism capable of being switched between a seat-locked state in which the seat main body is restrained at the first seat position and a lock-released state in which the restraint is released, in which the seat cushion frame is supported in a manner that a position thereof backward of a position connected to the front link is suspended by the seat supporting member via the rear link, and in a state where the seat main body is arranged at the first seat position, a free-end supporting point of the rear link is positioned at a predetermined position backward of a first vertical line passing a fixed-end supporting point of the rear link, and in a state where the seat main body is arranged at the second seat position, the free-end supporting point is positioned forward of the predetermined position.

BRIEF DESCRIPTION OF DRAWINGS

FIG. 5A is a side view of a main part of a slide lock mechanism (the slide-locked state) of a slide device on the right side of the automobile seat.

FIG. 5B is a side view of the main part of the slide lock mechanism (the slide-lock-released state) of the slide device on the right side of the automobile seat.

DESCRIPTION OF EMBODIMENTS

In the following, one preferred embodiment of the present invention will be detailed with reference to the accompanying drawings.

[Overall Configuration of Automobile Seat]

Figure 1:
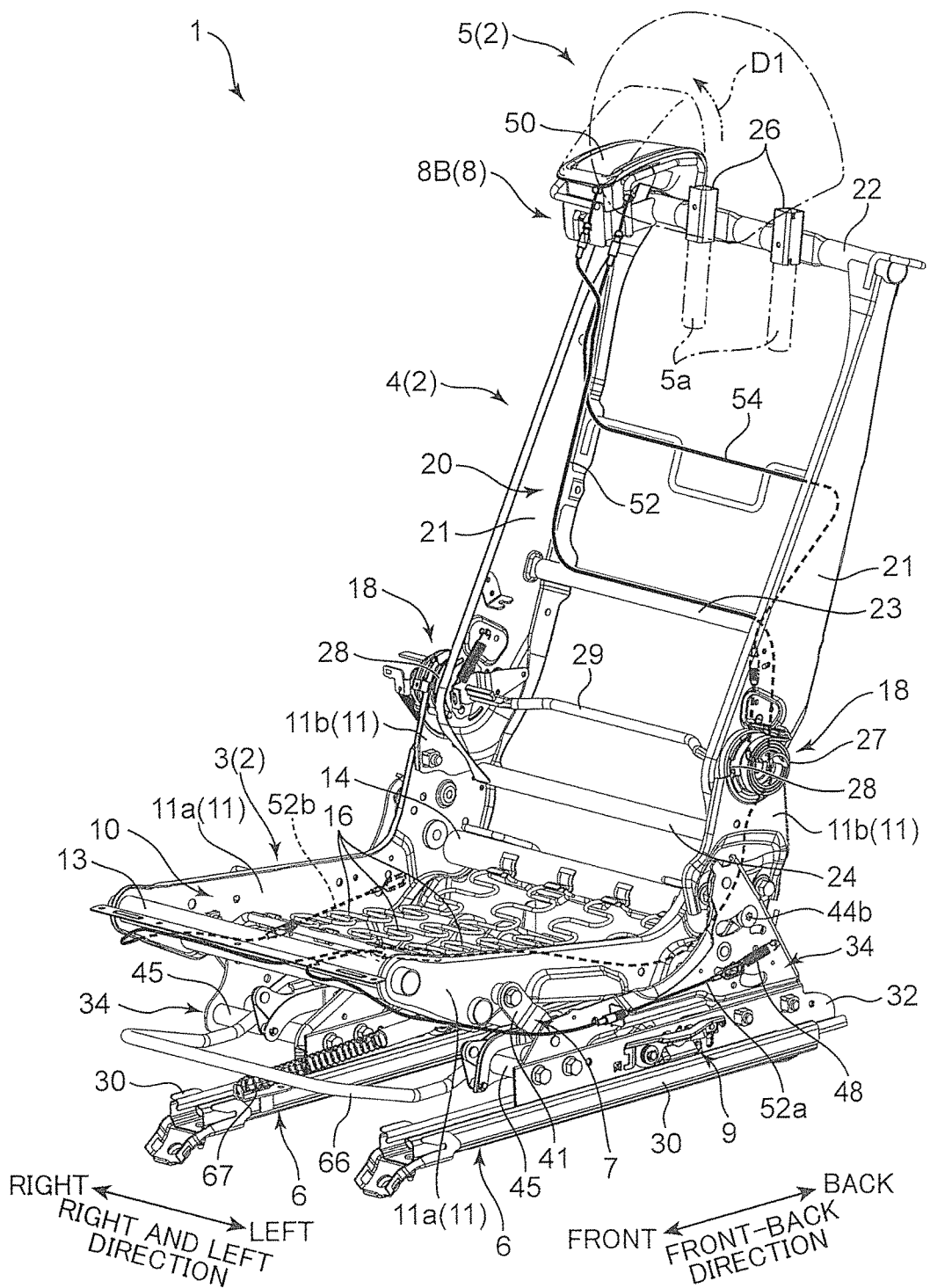
FIG. 1 is a perspective view showing an automobile seat (cushion pad and the like are omitted) according to the present invention.

FIG. 1 is a perspective view showing an automobile seat 1 according to the present invention. The automobile seat 1 shown in FIG. 1 is applied, for example, as a passenger seat of a wagon vehicle equipped with a left steering wheel. In the figure, the automobile seat 1 is shown with illustration of a cushion pad or a trim omitted.

As shown in FIG. 1, the automobile seat 1 (hereinafter, abbreviated as a seat 1) includes a seat main body 2 on which a passenger is seated, a pair of right and left slide devices 6 fixed to a floor panel of a vehicle to support the seat main body 2 (one example of a seat supporting member of the present invention). In this example, the right and left slide devices 6 are not identical to each other in height and are offset in an up-down direction (see FIG. 2). This is intended to correspond to a shape of a floor panel of a vehicle on which the seat 1 is mounted.

The seat main body 2 includes a seat cushion 3, a seat back 4, and a headrest 5. The seat cushion 3 includes a seat cushion frame 10, a cushion pad not shown which is fixed to the seat cushion frame 10, and a trim (skin layer) not shown which externally covers these parts. The seat back 4 similarly includes a seat back frame 20, a cushion pad not shown which is fixed to the seat back frame 20, and a trim not shown which externally covers these parts. The seat cushion frame 10 and the seat back frame 20 together constitute a seat frame of the seat main body 2.

The seat cushion frame 10 includes a pair of right and left side plates 11, cross pipes 13 and 14 provided between both the side plates 11 to connect the side plates 11 at positions different from each other in a front-back direction, and a plurality of support springs 16 stretching between the cross pipes 13 and 14.

The side plate 11 has an L-shape in a side view having a straight portion 11a extending in the front-back direction and a rising portion 11b extending upward from a rear end of the straight portion 11a. Front end portions of the straight portions 11a are connected to each other by the cross pipe 13, and rear end portions of the straight portions 11a are connected to each other by the cross pipe 14. In this manner, the right and left side plates 11 are integrated via the cross pipes 13 and 14. Then, the plurality (four in the example in FIG. 1) of support springs 16 having a corrugated shape is disposed in parallel to each other between the front and rear cross pipes 13 and 14.

The support springs 16 elastically supports a load of a seated passenger via a cushion pad not shown. The seat cushion frame 10 may be configured to have an elastic seat or a cushion pan disposed between the front and rear cross pipes 13 and 14 in place of the support springs 16. An elastic seat is a net-shaped seat formed of synthetic fiber including polyester resins such as polyethylene and polypropylene, or polyamide resins such as nylon 6 and nylon 66 and has moderate elasticity and sufficient strength supporting a load of a seated passenger. Additionally, the cushion pan is configured with a cushion pad fixed on a plate made of metal (e.g. steel plate).

The seat back frame 20 includes a pair of right and left side plates 21 extending in the up-down direction, three cross pipes 22 to 24 provided between both the side plates 21 to connect the side plates 21 at positions different from each other in the up-down direction, and a plurality of support springs not shown which stretches between the side plates 21.

The three cross pipes 22 to 24 connect the side plates 21 at an upper end portion, a middle portion, and a lower end portion of each of the side plates 21, respectively.

On the uppermost cross pipe 22, a pair of headrest supporting portions 26 is provided at a predetermined interval in a right and left direction. The headrest supporting portions 26 each have a cylindrical shape penetrating in the up-down direction, and insertion of two supporting shafts 5a provided in the headrest 5 into the headrest supporting portions 26, respectively, leads to supporting the headrest 5 in an upper end portion of the seat back 4 (the seat back frame 20). A pole guide (not shown) made of resin such as polypropylene (PP) is attached to each of the headrest supporting portions 26, and each of the supporting shafts 5a is inserted into each pole guide.

The plurality of support springs of the seat back frame 20 are aligned in parallel to each other in the up-down direction so as to be disposed between both the side plates 21. Similarly to the seat cushion frame 10, the seat back frame 20 may be also configured to have the elastic seat in place of the support springs.

Each side plate 21 of the seat back frame 20 is turnably connected to each side plate 11 of the seat cushion frame 10 via a reclining mechanism 18.

The reclining mechanism 18 adjusts an angle of the seat back 4 with respect to the seat cushion 3. The reclining mechanism 18 includes a shaft portion not shown which rotatably connects each of the side plates 11, 21, a spiral spring 27 which turnably energizes the seat back frame 20 toward the front side, a ratchet mechanism 28 which locks (engages) the seat back frame 20 at a desired angle position, and a reclining lever not shown which releases a locked state by the ratchet mechanism 28.

The reclining lever is rotatably supported by the side plate 11 on the right side of the seat cushion frame 10 and is connected to the reclining mechanism 18 on the right side. The right and left ratchet mechanisms 28 are connected to each other via a connection shaft 29 to enable simultaneous lock releasing operation by operation of the reclining lever.

The pair of right and left slide devices 6 supports the seat main body 2 as described above. These slide devices 6 have a common basic structure.

Figure 2:
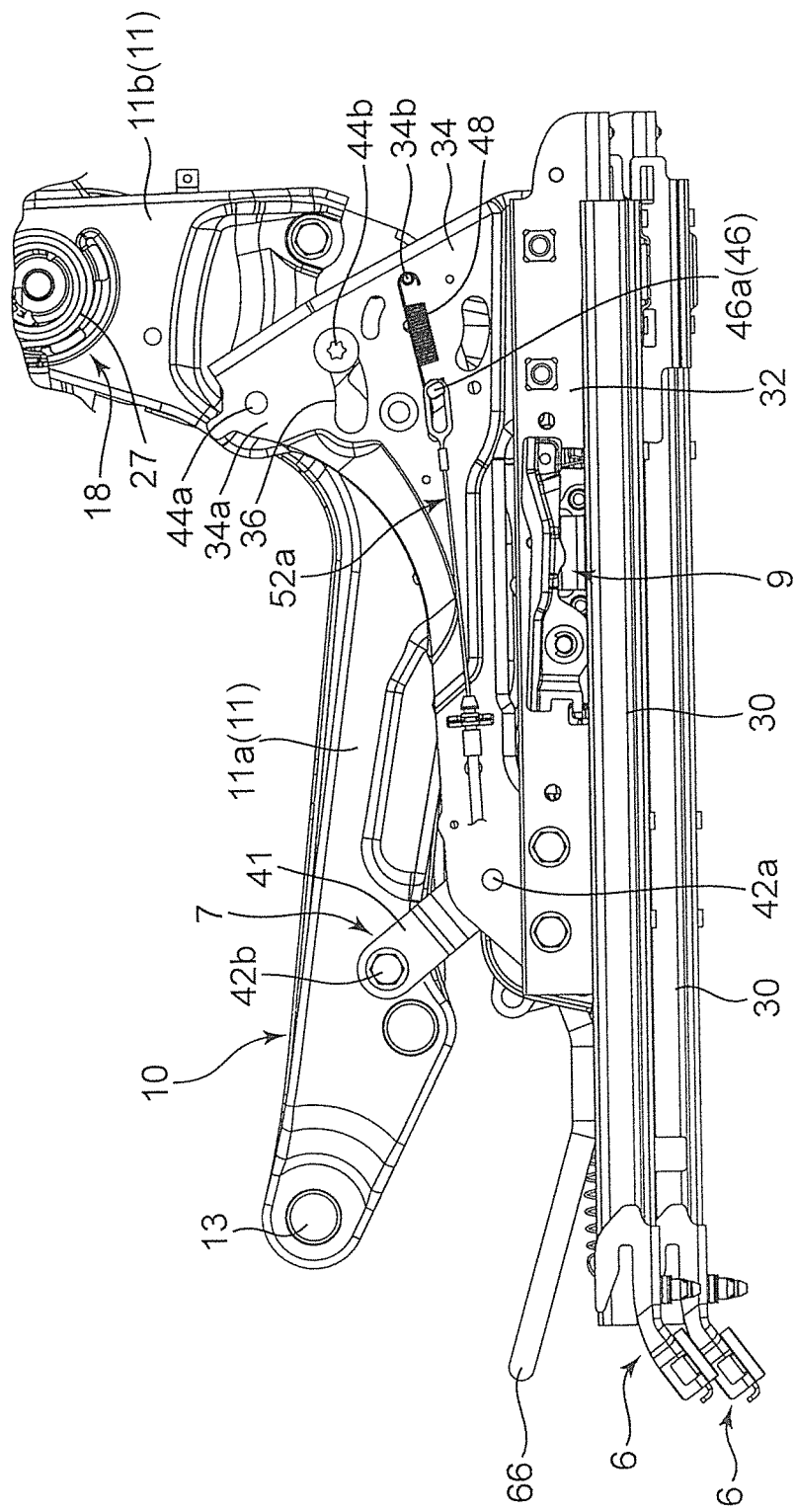
FIG. 2 is a side view of a main part of the automobile seat.
Figure 4A:
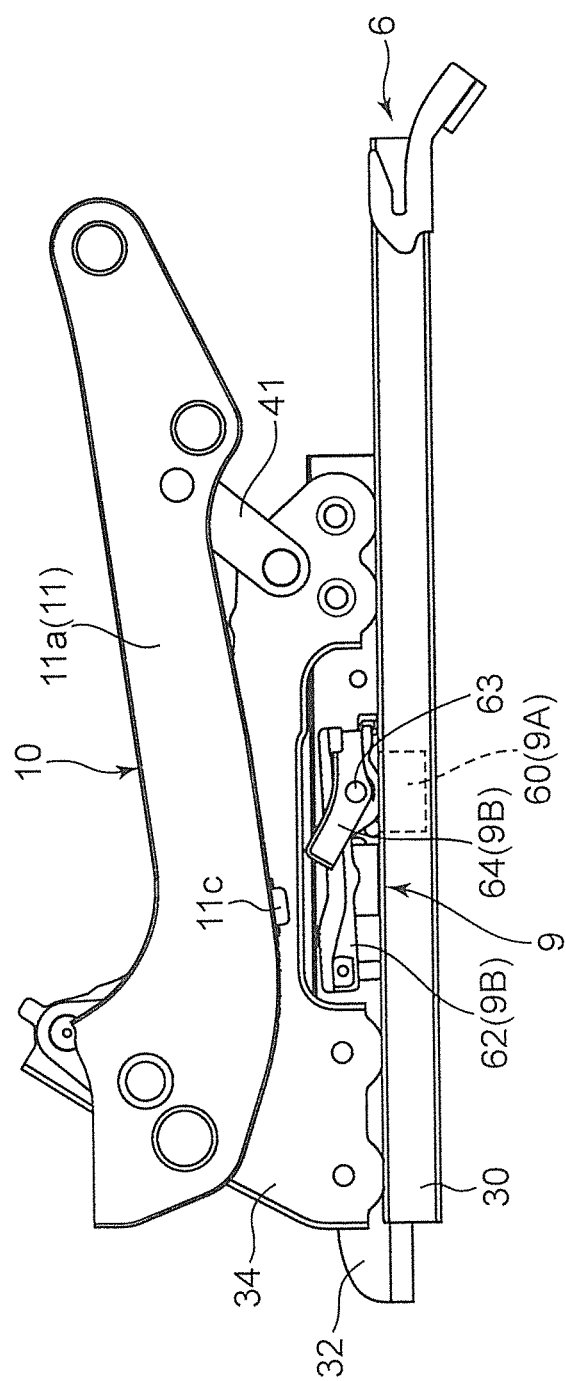
FIG. 4A is a side view of a main part of a slide lock mechanism (a slide-locked state) of a slide device on the left side of the automobile seat.

As shown in FIG. 1, FIG. 2, and FIG. 4A, the slide device 6 includes a lower rail 30 fixed to the floor panel of the vehicle to extend in the front-back direction, an upper rail 32 movably supported on the lower rail 30, and a slide lock mechanism 9 for regulating slide of the upper rail 32.

The upper rail 32 of each slide device 6 is provided with a bracket 34 for attaching a seat, so that the seat main body 2 is arranged between the brackets 34 of the right and left upper rails 32 and is supported by the brackets 34 via a link mechanism 7. In detail, the link mechanism 7 includes a front link 41 and a rear link 43 rotatably pivoted by the side plate 11 and the bracket 34 to connect the seat cushion frame 10 and the bracket 34, respectively, at positions different from each other in the front-back direction. In this manner, the seat main body 2 is supported by the right and left brackets 34 so as to be shiftable between a first seat position P1 shown in FIG. 3A, that is, a position corresponding to a posture assumed by a passenger when seated (appropriately referred to as a normal posture) and a second seat position P2 which is positioned forward of the first seat position P1 and corresponding to a forward-leaning posture as shown in FIG. 3B.

The front link 41 is disposed between the straight portion 11a of the side plate 11 and the bracket 34. One end of the front link 41 is rotatably connected to a front end portion of the bracket 34 via a connection shaft 42a and the other end of the front link 41 is rotatably connected at a position slightly backward of the front end of the straight portion 11a via a connection shaft 42b.

In a state where the seat main body 2 is arranged at the first seat position P1, a free-end supporting point of the front link 41, that is, a position of the connection shaft 42b, is located above a fixed-end supporting point, that is, the position of the connection shaft 42a and on a vertical line L2 (see FIG. 3A, corresponding to a second vertical line of the present invention) passing the connection shaft 42a, or at a position forward of the vertical line L2. In this example, the free-end supporting point (the connection shaft 42b) is positioned forward of the vertical line L2.

On the other hand, the rear link 43 is provided between the rising portion 11b of the side plate 11 and the bracket 34. One end of the rear link 43 is rotatably connected to a rear end portion of the bracket 34 via a connection shaft 44a and the other end of the rear link 43 is rotatably connected to a position slightly forward of the rear end of the straight portion 11a via a connection shaft 44b. In the rear end portion of the bracket 34, an extension portion 34a upwardly extending is provided. A fixed-end supporting point of the rear link 43, that is, the connection shaft 44a is fixed to an upper end portion of the extension portion 34a, and a free-end supporting point of the rear link 43, that is, the connection shaft 44b, is fixed to the side plate 11 at a position lower than the connection shaft 44a. In other words, a rear part of the seat cushion frame 10 is supported in a suspended state by the bracket 34 via the rear link 43.

With the seat main body 2 arranged at the first seat position P1, a position of the free-end supporting point (the connection shaft 44b) of the rear link 43 is located at a predetermined position (the position shown in FIG. 3A) backward of a vertical line L1 (see FIG. 3A, corresponding to a first vertical line of the present invention) passing the fixed-end supporting point (the connection shaft 44a).

Since the seat cushion frame 10 is supported by the bracket 34 via such a link mechanism 7, the seat main body 2 shifts due to its self-weight from the first seat position P1 to the second seat position P2 when seat lock to be described later is released with the seat main body 2 arranged at the first seat position P1. In detail, the rear part of the seat cushion frame 10 swings forward centered around the connection shaft 44a while going down due to the self-weight of the seat main body 2, and a front part of the seat cushion frame 10 goes down while swinging forward centered around the connection shaft 42a.

An axial stopper 45 extending in the right and left direction is fixed to a lower side of the connection shaft 42a of the front link 41 in the bracket 34, so that contact of the side plate 11 with the stopper 45 regulates a downward shift of the seat main body 2. In this manner, the seat main body 2 is maintained at the second seat position P2. Thus, in a state where the seat main body 2 is arranged at the second seat position P2, the free-end supporting point (the connection shaft 44b) of the rear link 43 is positioned forward of the vertical line L1. In other words, the free-end supporting point (the connection shaft 44b) is set to be positioned above a lowest point of a swing locus thereof.

The bracket 34 is formed with a guide hole 36 which has an arc shape and guides the connection shaft 44b of the rear link 43. Although not shown in detail, the connection shaft 44b is provided with a flange portion which engages with an edge portion of the guide hole 36 from an outer side of the bracket 34. This regulates shift of the connection shaft 44b in the right and left direction (a seat width direction) while allowing the free-end supporting point (the connection shaft 44b) to swingingly shift centered around the fixed-end supporting point (the connection shaft 44a) of the rear link 43. In other words, shift of the seat cushion frame 10 in the right and left direction with respect to the bracket 34 is regulated. In this example, the flange portion of the connection shaft 44b and the guide hole 36 correspond to a guide mechanism of the present invention.

The seat 1 is provided with a seat lock mechanism 8 capable of being switched between a seat-locked state in which the seat main body 2 is restrained at the first seat position P1, and a lock-released state in which the restraint is released (i.e., seat lock is released).

The seat lock mechanism 8 includes a lock mechanism 8A for restraining the seat main body 2 at the first seat position P1, and a lock releasing mechanism 8B for releasing seat lock.

The lock mechanism 8A is provided in each of the right and left brackets 34. The lock mechanism 8A includes a cam member 46 arranged between the side plate 11 and the bracket 34 to be turnably supported by the bracket 34 via a supporting shaft 47 as shown in FIG. 3A, and an extension coil spring 48 (corresponding to an energizing member of the present invention) which energizes the cam member 46.

Figure 3A:
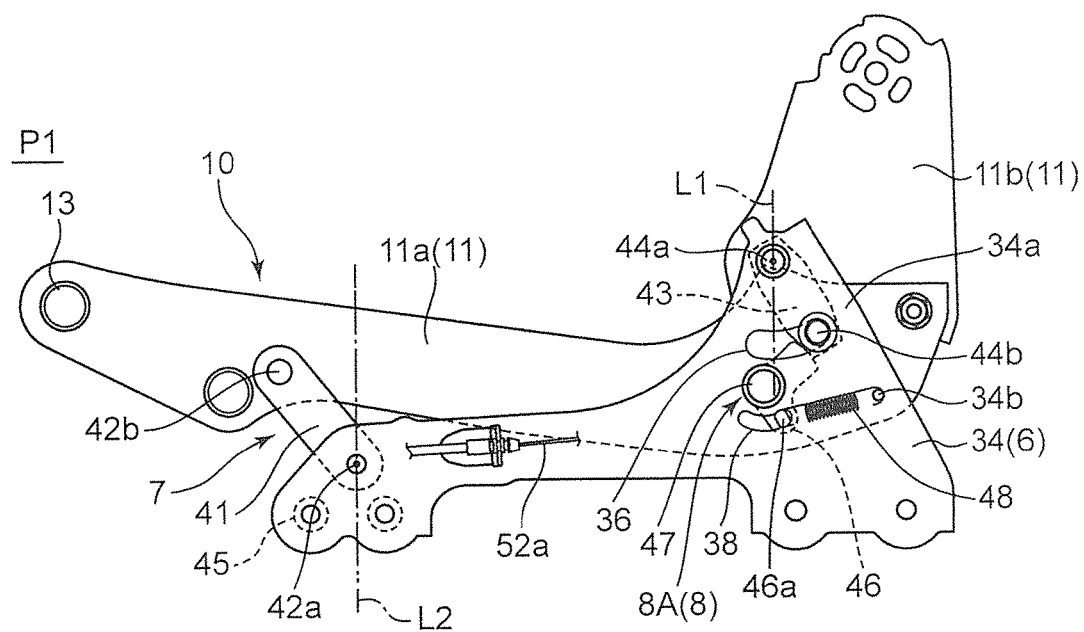
FIG. 3A is a side view of the main part of the automobile seat, which shows a state where a seat cushion frame is arranged at a first seat position.
Figure 3B:
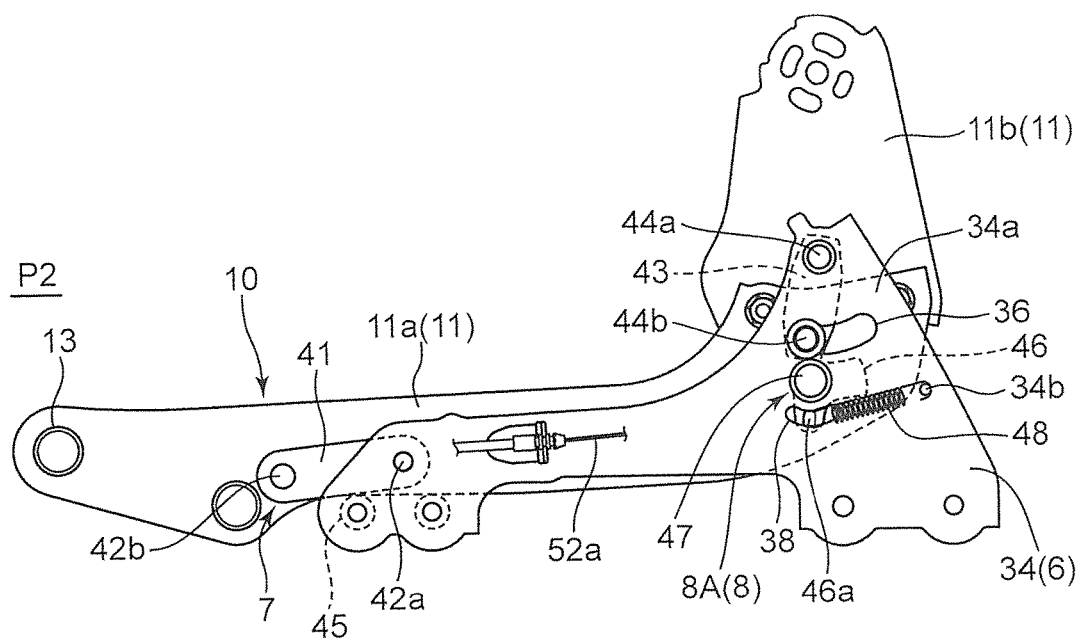
FIG. 3B is a side view of the main part of the automobile seat, which shows a state where the seat cushion frame is arranged at a second seat position.

The cam member 46 is provided to be turnable between an engagement position at which with the seat main body 2 arranged at the first seat position P1, the cam member 46 engages (comes into contact) with the rear link 43 from the front side to regulate turning of the rear link 43 as shown in FIG. 3A, and a retraction position at which the cam member 46 retracts downward from a swinging course of the rear link 43 as shown in FIG. 3B. The bracket 34 is formed with a guide hole 38 having an arc shape and corresponding to a distance from the engagement position to the retraction position, into which guide hole 38 a projection portion 46a provided in the cam member 46 is inserted. Then, the coil spring 48 is stretched between the projection portion 46a of the cam member 46 and a pin 34b fixed to an outer side surface (side surface opposite to a side of the seat main body 2) of the bracket 34. In this manner, the cam member 46 is energized toward the engagement position by resilient force of the coil spring 48.

The lock releasing mechanism 8B includes an operation lever 50 for releasing seat lock by the lock mechanism 8A, and a first operation wire 52 for transmitting operation force of the operation lever 50 to the cam member 46 as shown in FIG. 1. The operation lever 50 is a pull-up lever device and is provided at a right end of the upper end portion of the seat back 4. The first operation wire 52 has one end portion thereof fixed to the operation lever 50 and is wired in a predetermined course over the seat back frame 20 and the seat cushion frame 10. The other end of the first operation wire 52 is branched, at a front end portion of the seat cushion 3, into two branch wires 52a and 52b. The two branch wires 52a and 52b are wired along outer side surfaces of the right and left side plates 11 of the seat cushion frame 10, respectively, and engaged with the projection portions 46a of the cam members 46 as shown in FIG. 2.

Specifically, as shown in FIG. 3A, in the seat-locked state where the seat main body 2 is arranged at the first seat position P1 and the cam member 46 is engaged with the rear link 43, when the operation lever 50 is caused to rise in a direction indicated by an arrow D1 in FIG. 1, the projection portion 46a is pulled forward via the first operation wire 52 (the branch wires 52a and 52b), so that the cam member 46 is shifted from the engagement position to the retraction position against resilient force of the coil spring 48. As a result, as shown in FIG. 3B, an engagement state of the cam member 46 with the rear link 43 is released to allow the seat main body 2 to shift from the first seat position P1 to the second seat position P2. In other words, the seat lock is released. On the other hand, as shown in FIG. 3B, when the seat main body 2 arranged at the second seat position P2 is shifted to the first seat position P1, along with the shift, the cam member 46 is shifted from the retraction position to the engagement position by resilient force of the coil spring 48. Then, when the seat main body 2 is completely reset to the first seat position P1, the cam member 46 engages with the rear link 43, resulting in resetting to the seat-locked state in which the seat main body 2 is restrained at the first seat position P1.

As shown in FIG. 1, to the operation lever 50, one end of a second operation wire 54 separate from the first operation wire 52 is fixed. The second operation wire 54 is wired in the seat back frame 20 in a predetermined course, and has the other end connected to the ratchet mechanism 28 of the reclining mechanism 18 on the left side. In this manner, when the operation lever 50 is operated, lock of the seat back 4 by the ratchet mechanism 28 on the left side is released via the second operation wire 54, while lock of the seat back 4 by the ratchet mechanism 28 on the right side is released via the connection shaft 29, so that the seat back 4 is turnably shifted to a predetermined walk-in forward-leaning position by resilient force of the spiral spring 27. The walk-in forward-leaning position is a position set in advance for leaning the seat back 4 forward in order to prevent the seat back 4 from hindering getting on and off and is set at a position between a position at which the seat back 4 is completely brought down so as to overlap the seat cushion 3 and a position at which the seat back 4 stands substantially straight (a position of a standing-up posture). In this example, it is a position, for example, leaned forward by approximately 10° to 20° from the standing-up posture (indicated by a chain double-dashed line in FIG. 6A).

Thus, the reclining mechanism 18 shifts the seat back 4 to the walk-in forward-leaning position by operation of the operation lever 50 in association with switching of the seat lock mechanism 8 from the seat-locked state to the lock-released state.

Figure 4B:
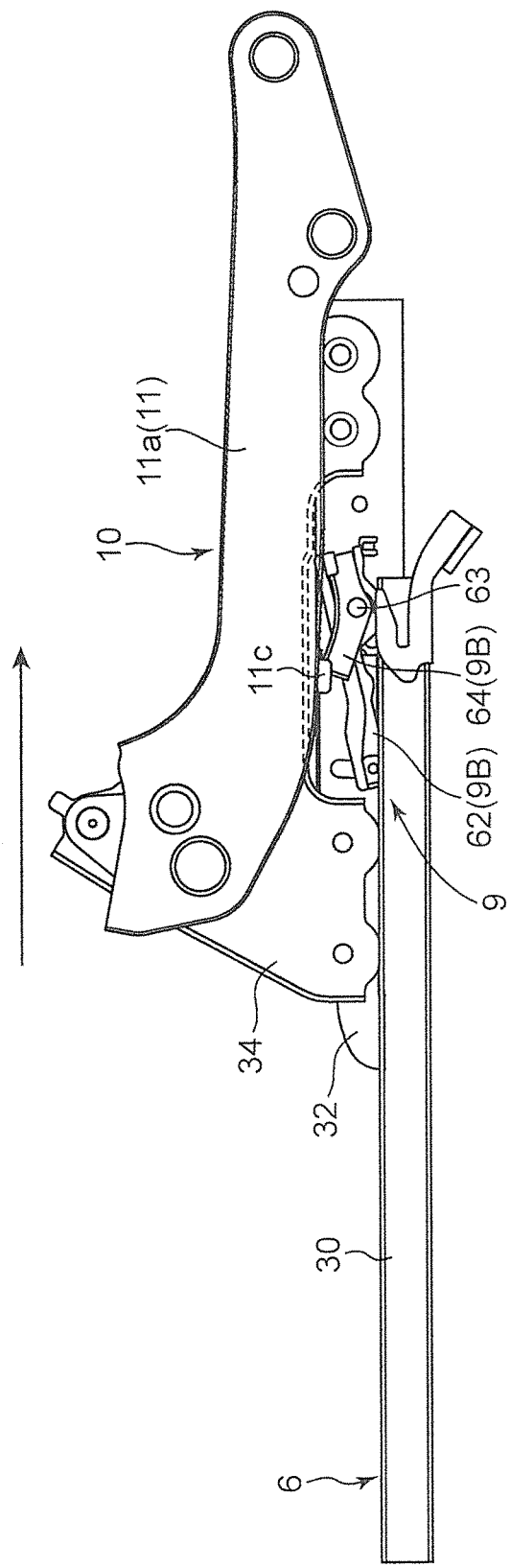
FIG. 4B is a side view of the main part of the slide lock mechanism (a slide-lock-released state) of the slide device on the left side of the automobile seat.

FIG. 4A, FIG. 4B, FIG. 5A, and FIG. 5B are side views showing the slide lock mechanism 9, FIG. 4A and FIG. 4B showing the slide lock mechanism 9 of the slide device 6 on the left side and FIG. 5A and FIG. 5B showing the slide lock mechanism 9 of the slide device 6 on the right side, all the figures being seen from the right side of the seat 1.

The slide lock mechanism 9 regulates slide of the upper rail 32 as described above. The slide lock mechanism 9 on the left side includes a lock mechanism 9A which regulates the movement of the upper rail 32 to restrain the upper rail 32 at a desired position of the lower rail 30, and a lock releasing mechanism 9B for releasing the regulation (i.e., releasing the slide lock) as shown in FIG. 4A.

Although not shown in detail, the lock mechanism 9A includes a plurality of lock holes formed in the lower rail 30, and a locking member 60 fixed to the upper rail 32.

In the lower rail 30, the plurality of lock holes each penetrating (or recessed) in the up-down direction are formed in a longitudinal direction (the front-back direction) at fixed intervals. On the other hand, the locking member 60 is provided with a lock claw not shown which is shiftable in the up-down direction and energized downward by a spring member such as a compression coil spring. In other words, insertion (engagement) of the lock claw of the locking member 60 into any of the plurality of lock holes formed in the lower rail 30 regulates movement of the upper rail 32, thereby restraining the upper rail 32 at the position of the lock hole.

On the other hand, the lock releasing mechanism 9B includes a first arm 62 swingingly supported on the upper rail 32 via a supporting shaft not shown and extending in the front-back direction, a second arm 64 having a generally V-shape and separate from the first arm 62 and swingingly supported on the upper rail 32 via a supporting shaft 63, and a projection portion 11c formed on a lower face of the side plate 11 on the left side.

The first arm 62 is provided to be engageable with the lock claw and is configured to engage with the lock claw as a result of upward shift of a front end portion of the first arm 62, thereby raising the lock claw against energizing force of the spring member. On the other hand, the second arm 64 is supported, at a generally middle portion thereof, on the upper rail 32 via the supporting shaft 63. A distal end portion of the second arm 64 is engaged with the front end portion of the first arm 62 from below, so that pushing down a rear end portion of the second arm 64 is followed by pushing up the front end portion of the first arm 62. Then, the projection portion 11c is provided at a position which allows coming into contact with the rear end portion of the second arm 64 from above to push down the rear end portion upon shift of the seat main body 2 from the first seat position P1 to the second seat position P2.

In a state where the seat main body 2 is arranged at the first seat position P1, the first arm 62 is energized by resilient force of a spring member not shown such as a coil spring, so that a distal end portion of the first arm 62 is arranged at a position where the distal end portion of the second arm 64 is pushed down as shown in FIG. 4A. In this state, the first arm 62 is in a non-engagement state with respect to the lock claw and a state is maintained in which the lock claw is inserted in the lock hole. Specifically, the slide device 6 is maintained at the slide-locked state in which movement of the upper rail 32 is regulated. On the other hand, when the seat main body 2 is arranged at the second seat position P2, the projection portion 11c comes into contact with the rear end portion of the second arm 64 to push down the rear end portion, so that the front end portion of the first arm 62 is pushed up by the second arm 64 as shown in FIG. 4B. Thus, when the front end portion of the first arm 62 shifts upward, the first arm 62 engages with the lock claw to raise the lock claw against energizing force of the spring member. This brings about a slide-lock-released state in which the lock claw is drawn out from the lock hole, enabling the upper rail 32 to move relative to the lower rail 30.

While the foregoing is the configuration of the slide lock mechanism 9 on the left side, similarly to the slide lock mechanism 9 on the left side, the slide lock mechanism 9 on the right side includes the lock mechanism 9A and the lock releasing mechanism 9B. However, the slide lock mechanism 9 on the right side has a configuration slightly different from that of the lock releasing mechanism 9B on the left side as shown in FIG. 5A. To be specific, the second arm 64 is swingingly supported by a bracket 35 fixed to the upper rail 32 via the supporting shaft 63, the bracket 35 being different from the bracket 34 by which the seat cushion frame 10 is supported. Then, the distal end portion of the second arm 64 engages with a rear end portion of the first arm 62 from above. The side plate 11 is provided with a wire member 11d in place of the projection portion 11c. The wire member 11d is provided to engage with the rear end portion of the second arm 64 when the seat main body 2 shifts from the first seat position P1 to the second seat position P2.

Specifically, in the slide lock mechanism 9 on the right side, when the seat main body 2 shifts from the first seat position P1 to the second seat position P2, the wire member 11d of the side plate 11 comes into contact with the rear end portion of the second arm 64 to swing the second arm 64 as shown in FIG. 5B. Along with the swinging, the rear end portion of the first arm 62 is pushed down (the front end portion of the first arm 62 is raised) to release the slide lock.

The right and left slide lock mechanisms 9, which the configuration of the lock releasing mechanism 9B in the slide lock mechanism 9 on the right side is more or less different from that of the lock releasing mechanism 9B in the slide lock mechanism 9 on the left side, are each configured to enter the slide-locked state when the seat main body 2 is arranged at the first seat position P1 and have the slide lock thereof released in association with shift of the seat main body 2 from the first seat position P1 to the second seat position P2 as described above.

A slide lock releasing lever 66 having a U-shape in a plan view is provided below the seat cushion 3 as shown in FIG. 1. The slide lock releasing lever 66 is swingingly supported in the up-down direction between the right and left brackets 34. Although not shown in detail, both end portions of the slide lock releasing lever 66 are connected to the first arms 62 of the right and left lock releasing mechanisms 9B so as to push down the rear end portions of the first arms 62 along with pull-up operation of the slide lock releasing lever 66, that is, to release the slide lock by raising the front end portions of the first arms 62.

Further, below the seat main body 2, an extension coil spring 67 is stretched along the slide device 6 on the right side between a front end portion of the lower rail 30 and a rear end portion of the seat cushion frame 10. In this manner, when the slide lock of the slide lock mechanism 9 is released, the seat main body 2 is energized toward the front side by resilient force of the coil spring 67.

[Walk-In Function and Operation and Effect of Automobile Seat 1]

Figure 6A:
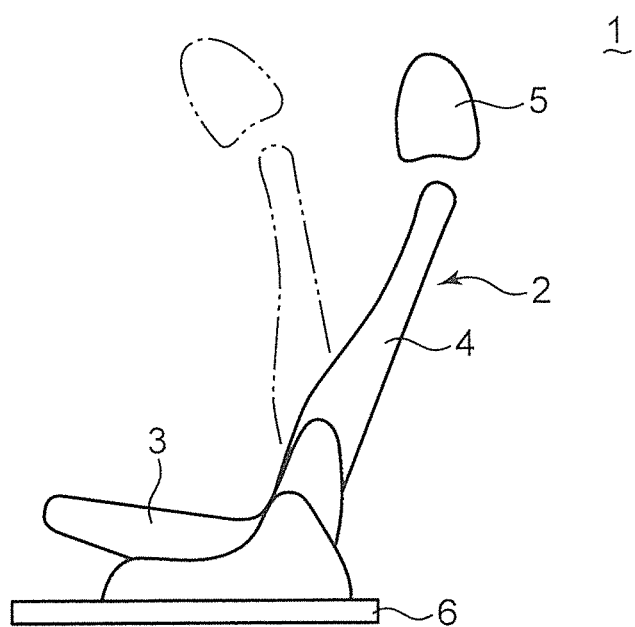
FIG. 6A is a schematic side view of the automobile seat (with a child seat yet to be mounted) in a seat-locked state.
Figure 6B:
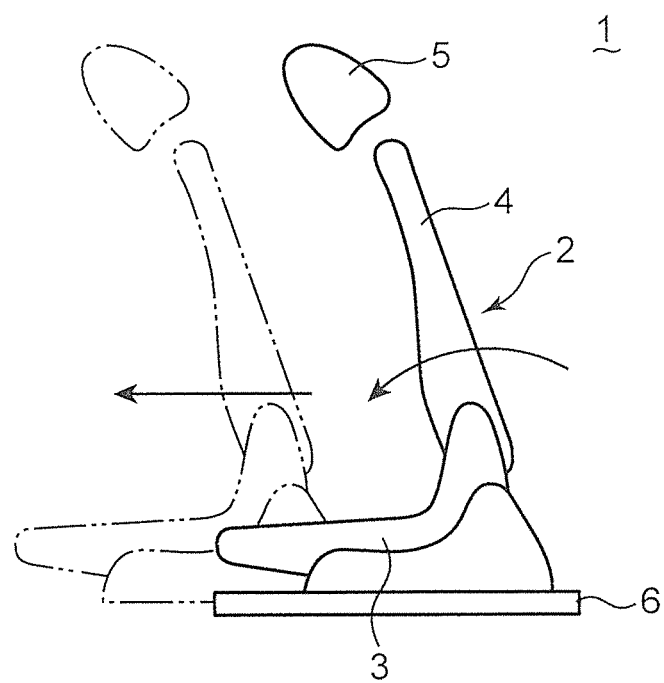
FIG. 6B is a schematic side view of the automobile seat (with the child seat yet to be mounted) in a seat-lock-released state.

A solid line in FIG. 6A shows a normal posture for a passenger to be seated, that is, a state where the seat main body 2 is arranged at the first seat position P1. When from this state, the passenger operates the operation lever 50, lock of the seat back 4 by the reclining mechanism 18 is released, so that the seat back 4 is shifted to the walk-in forward-leaning position (the position indicated by the chain double-dashed line in FIG. 6A), while seat lock by the seat lock mechanism 8 is released, so that the seat main body 2 is shifted from the first seat position P1 to the second seat position P2. As a result, as indicated by a solid line in FIG. 6B, the seat main body 2 in its entirety assumes the forward-leaning posture. Then, when the seat main body 2 leans forward in this manner, the slide lock by each slide lock mechanism 9 is released along with the leaning, so that the seat main body 2 moves to a slide end at the front by resilient force of the coil spring 67 as indicated by a chain double-dashed line in FIG. 6B. As a result, a large space for getting on and off is formed at the rear of the seat 1.

Figure 7A:
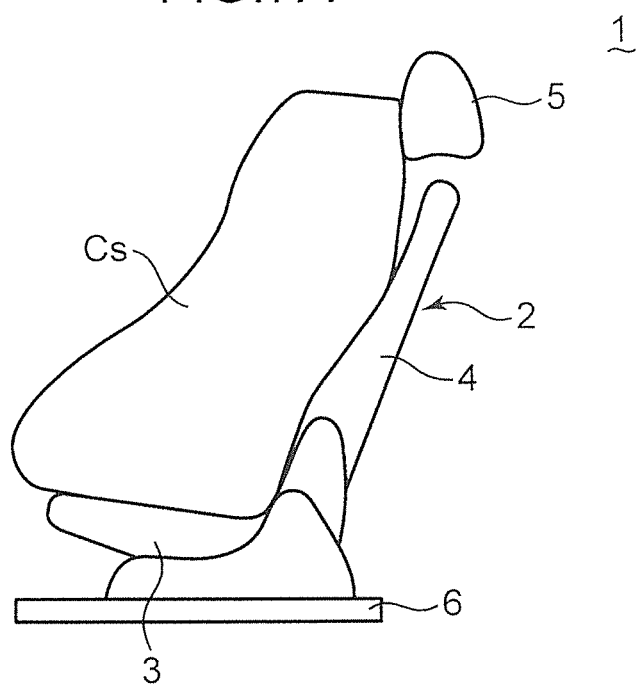
FIG. 7A is a schematic side view of the automobile seat (with a child seat mounted) in the seat-locked state.
Figure 7B:
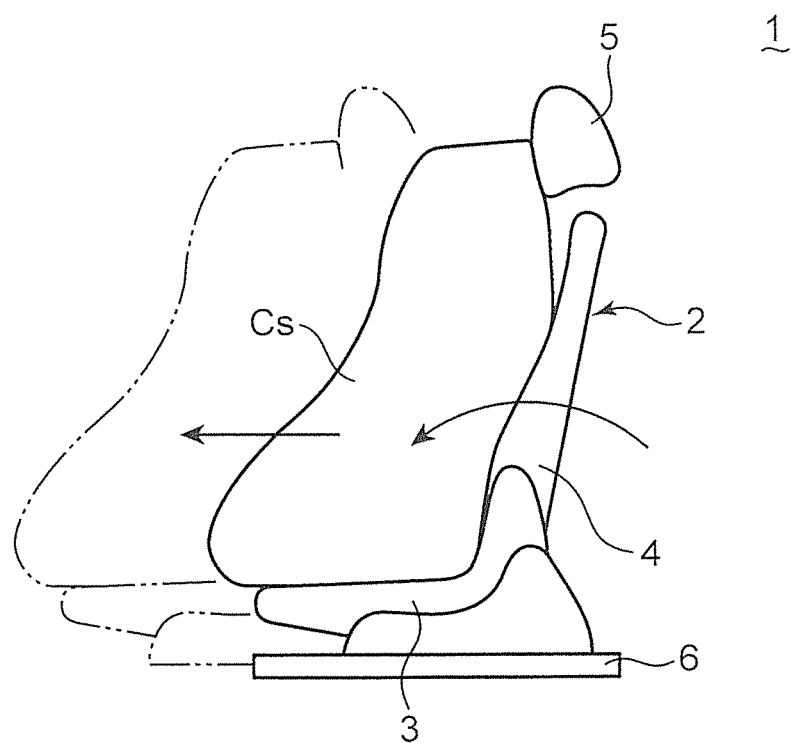
FIG. 7B is a schematic side view of the automobile seat (with the child seat mounted) in the seat-lock-released state.

FIG. 7A shows a state in which a child seat Cs is mounted on the seat main body 2 and the seat main body 2 is arranged at the first seat position P1. Additionally, in this case, when a passenger operates the operation lever 50, lock of the seat back 4 by the reclining mechanism 18 and seat lock by the seat lock mechanism 8 are released. However, in this case, since the child seat Cs is mounted on the seat main body 2, even if the lock of the seat back 4 is released, the seat back 4 is not allowed to shift to the walk-in forward-leaning position. Therefore, while the seat main body 2 maintains the position of the seat back 4 as shown in FIG. 7B, the seat main body 2 in its entirety assumes the forward-leaning posture as indicated by a solid line in FIG. 7B. Then, as the seat main body 2 leans forward, slide lock by each slide lock mechanism 9 is released, so that the seat main body 2 moves to the slide end at the front by resilient force of the coil spring 67 as indicated by a chain double-dashed line in FIG. 7B.

As described in the foregoing, even when the child seat Cs is mounted, the seat 1 enables the seat main body 2 in its entirety to shift to the forward-leaning posture. Therefore, similarly to a conventional seat of this kind (the seat recited in Patent Literature 1 in Background Art), even in a state where the child seat Cs is mounted, a space for getting on and off can be satisfactorily ensured in a rear seat of the seat 1.

Additionally, in the seat 1, when seat lock by the seat lock mechanism 8 is released, the seat main body 2 spontaneously shifts from the first seat position P1 to the second seat position P2 due to the self-weight to assume the forward-leaning posture as described above. It is therefore unnecessary to push up the seat main body as is done in a conventional seat, so that the seat main body 2 is allowed to assume the forward-leaning posture from the normal posture without difficulty. Further, in the seat 1, as the seat main body 2 shifts to the forward-leaning posture, the slide lock by the slide lock mechanism 9 is spontaneously released to cause the seat main body 2 to shift to the slide end at the front by resilient force of the coil spring 67. It is therefore possible to ensure a large space for getting on and off at the rear of the seat main body 2 by one-touch operation of only pulling up the operation lever 50 without difficulty.

Additionally, since the rear part of the seat cushion frame 10 is supported by the bracket 34 in a suspended state via the rear link 43, when the seat main body 2 is reset from the second seat position P2 to the first seat position P1, the seat main body 2 can be reset with relatively small force only by pushing the seat main body 2 backward.

Figure 8A:
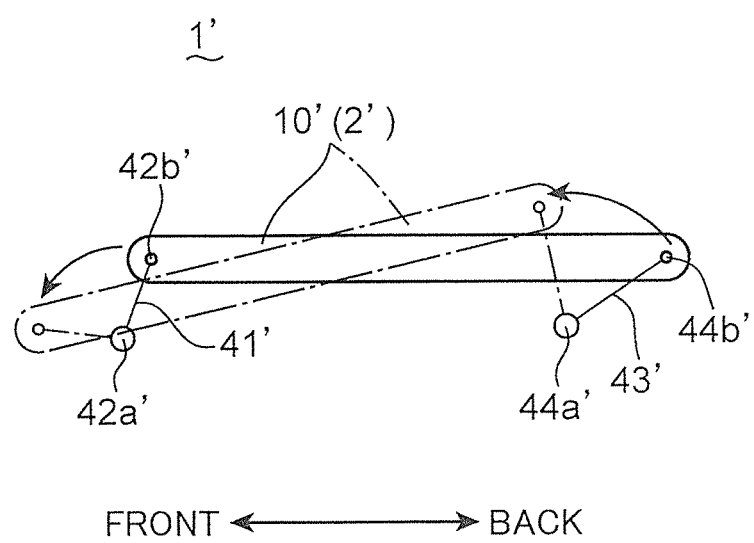
FIG. 8A is a schematic view of a link mechanism of a conventional automobile seat.
Figure 8B:
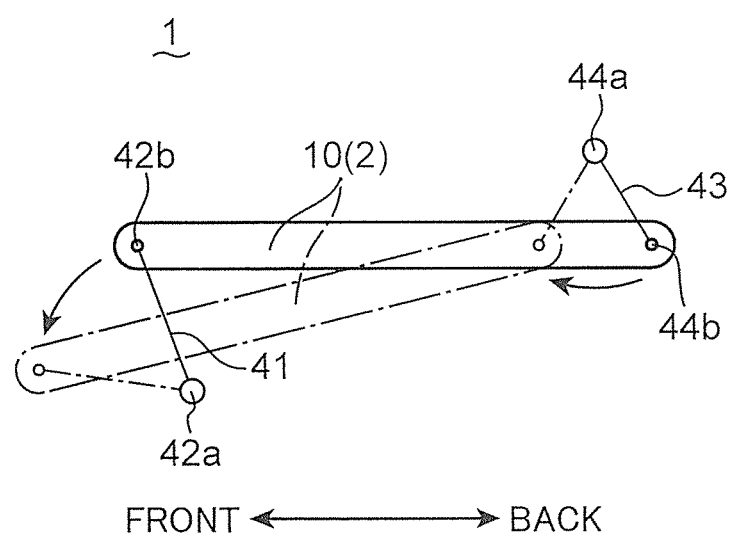
FIG. 8B is a schematic view of a link mechanism of the automobile seat shown in FIG. 1.

A difference between a conventional seat and the seat 1 of the above embodiment will be described herein in detail with reference to FIG. 8A and FIG. 8B. FIG. 8A schematically shows a link mechanism of a conventional seat and FIG. 8B schematically shows the link mechanism 7 of the seat 1 of the embodiment. For clarifying a correspondence relation between new and old structures, of the conventional seat, a part corresponding to the seat 1 of the embodiment is given the same names and codes as those of the seat 1 with dashes to distinguish from the seat 1 of the embodiment.

A conventional seat 1' has a structure in which a front and a rear of a seat cushion frame 10' are supported by a front link 41' and a rear link 43' from below as shown in FIG. 8A, and is configured such that at the shift from the normal posture to the forward-leaning posture, each of free-end supporting points (connection shafts 42b' and 44b') of the links 41' and 43' shifts from the rear side to the front side bridging over a vertical line passing the center of each of fixed-end supporting points (connection shafts 42a' and 44a') in a gentle arc manner. Specifically, for shifting a seat main body 2' from the normal posture to the forward-leaning posture, as indicated by a solid line arrow in the figure, operation should be conducted to push up the seat main body 2'. When the seat main body 2' is reset to the normal posture, the seat main body 2' needs to be similarly pushed up.

By contrast, in the seat 1 of the embodiment, the rear part of the seat cushion frame 10 is supported in a suspended state via the rear link 43 as shown in FIG. 8B, and at the first seat position P1 at which the seat main body 2 assumes the normal posture, the free-end supporting point (the connection shaft 44b) of the rear link 43 is positioned backward of the vertical line L1 (see FIG. 3A) passing the fixed-end supporting point (the connection shaft 44a). In other words, the free-end supporting point (the connection shaft 44b) is positioned above a lowest point of a swing locus thereof. Additionally, the free-end supporting point (the connection shaft 42b) of the front link 41 is positioned above the fixed-end supporting point (the connection shaft 44a) and forward of the vertical line L2 (see FIG. 3A) passing the fixed-end supporting point. Therefore, when the seat main body 2 is shifted from the normal posture to the forward-leaning posture, releasing seat lock results in that the seat main body 2 spontaneously shifts from the normal posture to the forward-leaning posture due to the self-weight without pushing up the seat main body 2' as is done in the conventional seat F. Besides, at the second seat position P2 at which the seat main body 2 assumes the forward-leaning posture, the free-end supporting point (the connection shaft 44b) of the rear link 43 is positioned forward of the vertical line L1, that is, the free-end supporting point (the connection shaft 44b) is positioned above the lowest point of the swing locus, thereby exerting downward force to the rear part of the seat cushion frame 10. Therefore, also when the seat main body 2 is reset from the forward-leaning posture to the normal posture, the seat main body 2 can be reset to the first seat position P1 with relatively small force only by pushing the seat main body 2 backward without applying such large force as in the conventional seat V.

Accordingly, the above seat 1 has more excellent operability than that of the conventional seat 1' while satisfactorily ensuring a space for getting on and off.

Additionally, the seat lock mechanism 8 of the seat 1 is configured to lock the seat main body 2 by engaging the cam member 46 with each of the right and left rear links 43 to regulate shift of each rear link 43 directly by the cam member 46. This produces an advantage that rattling of the seat main body 2 is suppressed to stably restrain the seat main body 2 at the first seat position P1. In other words, for example, such a seat lock mechanism may be applied in which a central part of the cross pipe 14 of the seat cushion frame 10 is grasped by a catch. In this case, however, freeing the right and left rear links 43 makes the seat cushion frame 10 be more liable to have rattling. However, the seat lock mechanism 8 of the seat 1 effectively suppresses such rattling because shift of the rear link 43 is regulated directly by the cam member 46.

Additionally, the seat 1 suppresses rattling of the rear part of the seat cushion frame 10 in the right and left direction because the connection shaft 44b of each of the right and left rear links 43 is inserted into the guide hole 36 formed in the bracket 34, so that the flange portion provided in the connection shaft 44b engages with the bracket 34 from the outer side. Additionally, from this respect, the advantage is produced of stably restraining the seat main body 2 at the first seat position P1 or the second seat position P2, as well as stably shifting the seat main body 2 between these first and second seat positions P1 and P2.

Additionally, in the seat 1, lock of the reclining mechanism 18 is released in association with releasing of seat lock by the seat lock mechanism 8, so that the seat back 4 is shifted to a predetermined walk-in forward-leaning position, while the slide lock by the slide lock mechanism 9 is released to cause the seat main body 2 to shift to the slide end at the front. A further advantage is therefore produced that a very large space for getting on and off can be automatically ensured at the rear of the seat 1 by one-touch operation by the operation lever 50. In particular, because the seat 1 is configured in which with the projection portion 11c and the wire member 11d provided in the seat cushion frame 10, the projection portion 11c and the wire member 11d engage with the second arm 64 to release the slide lock along with shift of the seat cushion frame 10, a further advantage is produced that a practical configuration using shift of the seat main body 2 enables the slide lock release of the slide lock mechanism 9 and seat lock release of the seat lock mechanism 8 to be conducted in association with each other.

Although the seat 1 according to the present invention has been described in the foregoing, the seat 1 is for illustrative of a preferred embodiment of an automobile seat according to the present invention, and a specific configuration can be appropriately modified without departing from the gist thereof.

For example, the link mechanism 7 of the seat 1 is configured in which with the seat main body 2 arranged at the second seat position P2, the free-end supporting point (the connection shaft 44b) of the rear link 43 is positioned slightly forward of the vertical line L1 passing the fixed-end supporting point (the connection shaft 44a), that is, the free-end supporting point (the connection shaft 44b) is positioned slightly above the lowest point of the swing locus. However, the free-end supporting point (the connection shaft 44b) may be positioned on the vertical line L1 or backward of the same. In view of mitigating operation force at the time of resetting the second seat position P2 of the seat main body 2 to the first seat position P1, it is preferable to position the free-end supporting point (the connection shaft 44b) to be forward of the vertical line L1 as in the above embodiment. In this case, when the link mechanism 7 is configured such that height positions of the free-end supporting points (the connection shafts 44b) of the rear links 43 at the first and second seat positions P1 and P2 are substantially identical to each other as shown in FIG. 8B, the seat main body 2 can be reset more easily to the first seat position P1 at the time of resetting the seat main body 2 to the first seat position P1 by pushing the seat main body 2 backward in a horizontal direction.

The foregoing described present invention is summarized as follows.

In order to solve the above problem, the present invention provides an automobile seat to be installed on a floor panel of a vehicle, the automobile seat including a seat main body having a seat cushion frame; a seat supporting member attached to the floor panel; a link mechanism which includes a front link and a rear link rotatably pivoted by the seat cushion frame and the seat supporting member to connect the seat cushion frame and the seat supporting member at positions different from each other in a front-back direction, and allows the seat main body to shift between a first seat position corresponding to a posture assumed by a passenger when seated and a second seat position forward of the first seat position and corresponding to a forward-leaning posture; and a seat lock mechanism capable of being switched between a seat-locked state in which the seat main body is restrained at the first seat position and a lock-released state in which the restraint is released, in which the seat cushion frame is supported in a manner that a position thereof backward of a position connected to the front link is suspended by the seat supporting member via the rear link, and in a state where the seat main body is arranged at the first seat position, a free-end supporting point of the rear link is positioned at a predetermined position backward of a first vertical line passing a fixed-end supporting point of the rear link, and in a state where the seat main body is arranged at the second seat position, the free-end supporting point is positioned forward of the predetermined position.

According to the automobile seat, since the seat cushion frame is supported in a manner that a position thereof backward of a position connected to the front link is suspended by the seat supporting member via the rear link, and a predetermined position at which the free-end supporting point of the rear link is located corresponds to the first seat position, the predetermined position being backward of the first vertical line passing the fixed-end supporting point of the rear link, when the seat lock mechanism is switched from the seat-locked state to the seat-lock-released state (seat lock is released), the seat cushion frame swings forward centered around the fixed-end supporting point of the rear link while going down due to self-weight. Therefore, even if the seat main body is not pushed forward by externally applying large force, the seat main body is shiftable from the first seat position to the second seat position without difficulty. Additionally, because the seat cushion frame is supported in a manner that a position thereof backward of a position connected to the front link is suspended by the seat supporting member via the rear link, even when the seat main body is reset from the second seat position to the first seat position, the seat main body can be reset with relatively small force.

In the automobile seat, in a state where the seat main body is arranged at the first seat position, a free-end supporting point of the front link is preferably positioned above a position of a fixed-end supporting point of the front link and on a second vertical line passing the fixed-end supporting point, or forward of the second vertical line.

According to this configuration, when the seat lock is released, the rear part of the seat cushion frame swings forward centered around the fixed-end supporting point of the rear link while going down due to self-weight, and on the other hand, the front part of the seat cushion frame swings forward and downward centered around the fixed-end supporting point of the front link, and such shift of the seat cushion frame causes the seat main body to assume the forward-leaning posture. It is therefore possible to automatically shift the seat main body from the first seat position to the second seat position only by releasing the seat lock.

In the automobile seat, the second seat position is preferably such a position that the free-end supporting point of the rear link is positioned forward of the predetermined position and forward of the first vertical line.

According to this configuration, since in a state where the seat main body is arranged at the second seat position, the free-end supporting point of rear link is positioned above a lowest point of a swing locus, downward force is exerted to the rear part of the seat cushion frame. Therefore, when the seat main body is reset to the first seat position, the seat main body can be reset to the first seat position with relatively small force only by pushing the seat main body backward.

Additionally, in the automobile seat, the seat cushion frame preferably has a connection shaft which is the free-end supporting point of the rear link, and the automobile seat preferably further includes a guide mechanism which regulates shift of the connection shaft in a seat width direction while allowing the connection shaft to swingingly shift centered around the fixed-end supporting point of the rear link.

According to this configuration, the seat main body can be stably supported while suppressing rattling of the seat cushion frame in the seat width direction.

Additionally, in the automobile seat, the seat lock mechanism preferably includes a cam member which is shiftable between an engagement position at which rotation of the rear link is regulated by engagement with the rear link and a retraction position retracted from the engagement position; an operation lever which shifts the cam member from the engagement position to the retraction position; and an energizing member which energizes the cam member toward the engagement position.

According to this configuration, since shift of the rear link is directly regulated by the cam member by engaging the cam member with the rear link, the seat main body can be stably restrained at the first seat position while suppressing rattling of the seat main body.

Additionally, in the automobile seat, the seat supporting member preferably includes a lower rail fixed to the floor panel to extend in the front-back direction; an upper rail slidably supported on the lower rail and including a bracket to which the fixed-end supporting points of the front link and the rear link are connected; and a slide lock mechanism which is capable of being switched between a slide-locked state in which movement of the upper rail is regulated and a lock-released state in which the regulation is released, and which switches from the slide-locked state to the lock-released state in association with switching of the seat lock mechanism from the seat-locked state to the lock-released state.

According to this configuration, when the seat main body is shifted from the first seat position to the second seat position, the seat main body can be slid further forward. This makes it possible to ensure a larger space for getting on and off at the rear of the seat.

In the automobile seat, the seat main body may include a seat cushion having the seat cushion frame; a seat back having a seat back frame turnably connected to the seat cushion frame; and a reclining mechanism which adjusts an angle of the seat back such that the seat back is arranged at a predetermined walk-in forward-leaning position in association with switching of the seat lock mechanism from the seat-locked state to the lock-released state.

According to this configuration, the seat back can be leaned forward when the seat main body is shifted from the first seat position to the second seat position. It is therefore possible to ensure a larger space for getting on and off at the rear of the seat.

The invention claimed is:

1. An automobile seat to be installed on a floor panel of a vehicle, the automobile seat comprising:
   a seat main body having a seat cushion frame;
   a seat supporting member attached to the floor panel;
   a link mechanism which includes a front link and a rear link rotatably pivoted by the seat cushion frame and the seat supporting member to connect the seat cushion frame and the seat supporting member at positions different from each other in a front-back direction, and allows the seat main body to shift between a first seat position corresponding to a posture assumed by a passenger when seated and a second seat position forward of the first seat position and corresponding to a forward-leaning posture; and
   a seat lock mechanism capable of being switched between a seat-locked state in which the seat main body is restrained at the first seat position and a lock-released state in which the restraint is released, wherein
   the seat cushion frame is supported in a manner that a position thereof backward of a position connected to the front link is suspended by the seat supporting member via the rear link, and
   in a state where the seat main body is arranged at the first seat position, a free-end supporting point of the rear link is positioned at a predetermined position backward of a first vertical line passing a fixed-end supporting point of the rear link, and in a state where the seat main body is arranged at the second seat position, the free-end supporting point is positioned forward of the predetermined position.

2. The automobile seat according to claim 1, wherein
in a state where the seat main body is arranged at the first seat position, a free-end supporting point of the front link is positioned above a position of a fixed-end supporting point of the front link and on a second vertical line passing the fixed-end supporting point, or forward of the second vertical line.

3. The automobile seat according to claim 1, wherein
the second seat position is such a position that the free-end supporting point of the rear link is positioned forward of the predetermined position and forward of the first vertical line.

4. The automobile seat according to claim 1, wherein
the seat cushion frame has a connection shaft which is the free-end supporting point of the rear link,
the automobile seat further comprising:
a guide mechanism which regulates shift of the connection shaft in a seat width direction while allowing the connection shaft to swingingly shift centered around the fixed-end supporting point of the rear link.

5. The automobile seat according to claim 1, wherein
the seat lock mechanism comprises:
a cam member which is shiftable between an engagement position at which rotation of the rear link is regulated by engagement with the rear link and a retraction position retracted from the engagement position;
an operation lever which shifts the cam member from the engagement position to the retraction position; and
an energizing member which energizes the cam member toward the engagement position.

6. The automobile seat according to claim 1, wherein the seat supporting member comprises:
a lower rail fixed to the floor panel to extend in the front-back direction;
an upper rail slidably supported on the lower rail and including a bracket to which the fixed-end supporting points of the front link and the rear link are connected; and
a slide lock mechanism which is capable of being switched between a slide-locked state in which movement of the upper rail is regulated and a lock-released state in which the regulation is released, and which switches from the slide-locked state to the lock-released state in association with switching of the seat lock mechanism from the seat-locked state to the lock-released state.

7. The automobile seat according to claim 5, wherein the seat main body comprises:
a seat cushion having the seat cushion frame;
a seat back having a seat back frame turnably connected to the seat cushion frame; and
a reclining mechanism which adjusts an angle of the seat back such that the seat back is arranged at a predetermined walk-in forward-leaning position in association with switching of the seat lock mechanism from the seat-locked state to the lock-released state.

* * * * *